UNITED STATES PATENT OFFICE.

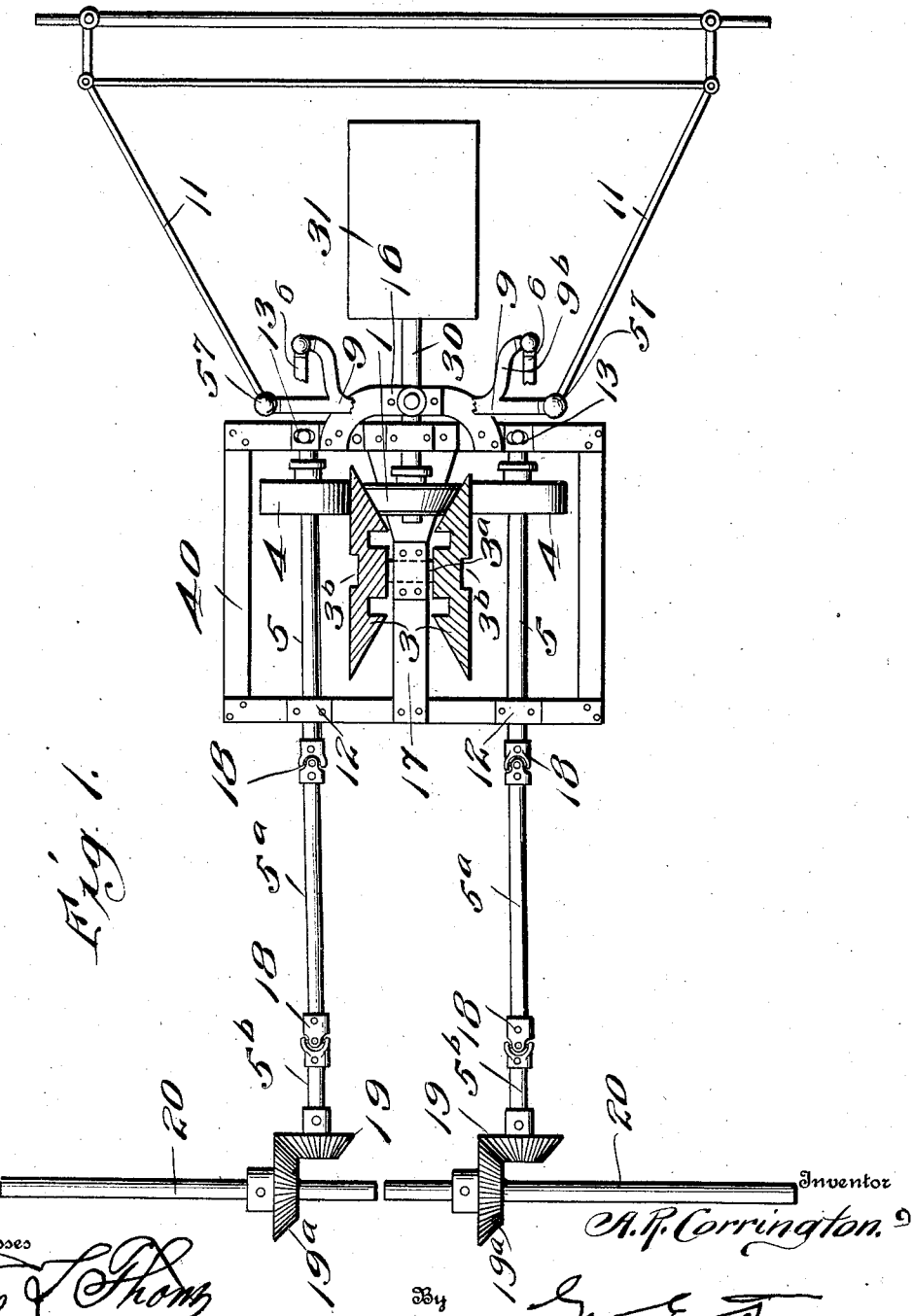

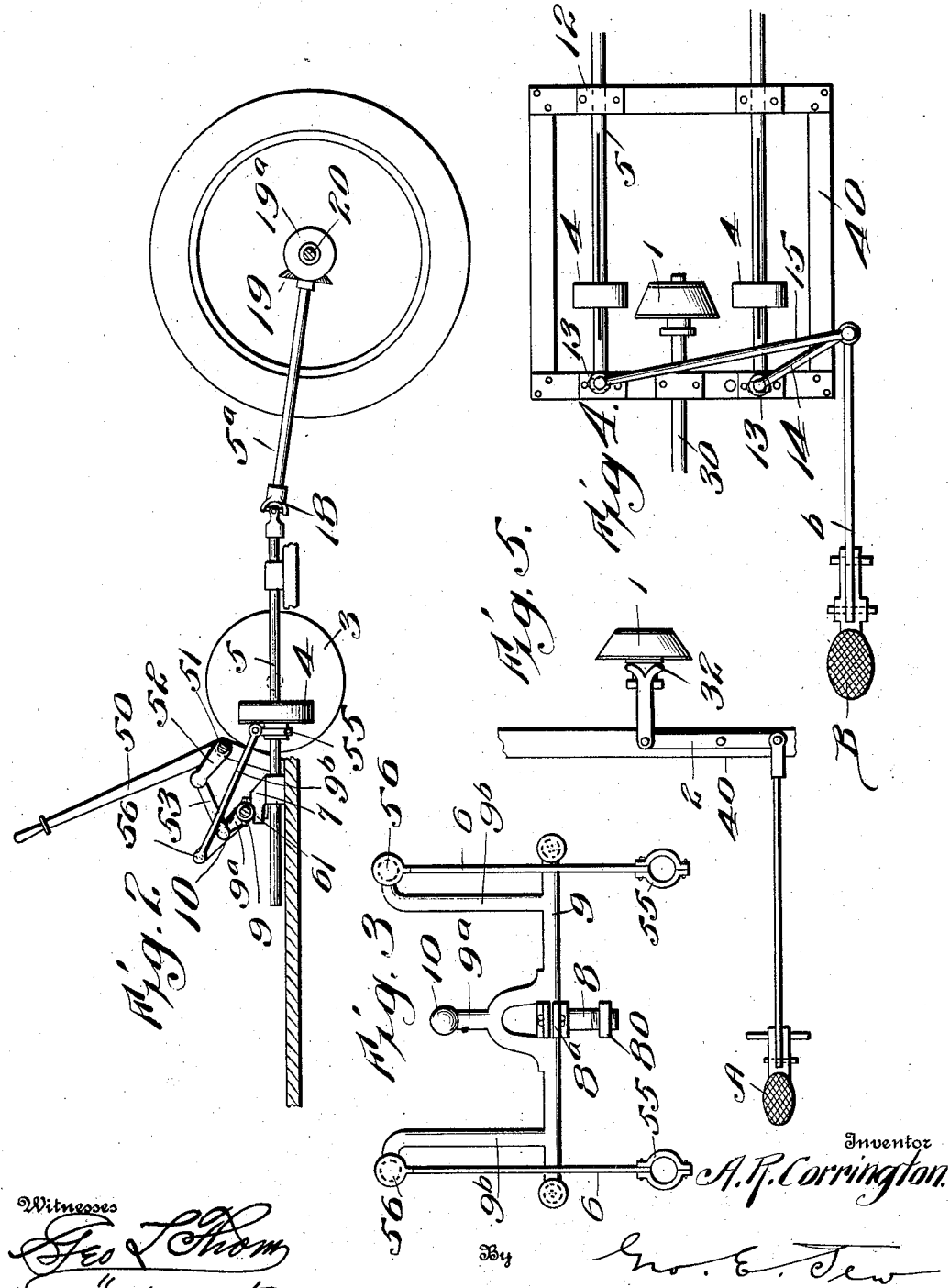

ALDON R. CORRINGTON, OF HARTLEY, IOWA, ASSIGNOR OF ONE-HALF TO G. E. KNAACK, OF HARTLEY, IOWA.

DRIVING-GEAR FOR MOTOR-VEHICLES.

944,600.     Specification of Letters Patent.     Patented Dec. 28, 1909.

Application filed June 14, 1909. Serial No. 502,074.

*To all whom it may concern:*

Be it known that I, ALDON R. CORRINGTON, a citizen of the United States, residing at Hartley, in the county of O'Brien and State of Iowa, have invented certain new and useful Improvements in Driving-Gear for Motor-Vehicles, of which the following is a specification.

This invention relates to friction transmission mechanism, and comprises particularly an improved mechanism for transmitting power from the engine to the rear axle of an automobile.

The invention is characterized particularly by a double drive, and the absence of a differential gearing on the rear axle. That is, each axle section is driven by different devices to which motion, however, is transmitted from a single engine shaft, the transmission device at each side being controlled by the movement of the front axle to increase or decrease the relative speeds of the rear axle sections, said increase being in proportion to the degree to which the front axle is turned, being effective at all speeds to produce different motion of the rear axle sections. The gearing is furthermore provided with means whereby it may be reversed, or the speed varied.

Further improvements in detail will be evident from the following description and the accompanying drawings.

In the drawings, Figure 1 is a plan view of the gearing, parts being broken away; Fig. 2 is a side elevation, parts being omitted; Fig. 3 is a detail of a swiveling rocker the manipulation of which controls the speed and the differential action; Fig. 4 is a detail in plan of the devices for controlling the friction drive; Fig. 5 is a detail in plan of the means for controlling the cone wheel between the driving wheels.

Referring specifically to the drawings, 1 is a cone friction wheel mounted upon the squared end of the engine shaft 30, the engine being indicated in diagram at 31. This cone wheel is mounted on the squared end of the shaft, or by means of a key seat and key, so that it has slight longitudinal movement, said movement being produced by the means shown in Fig. 5, consisting of a fork 32 connected to a lever 2 pivoted on the frame 40 and connected to a pedal A the manipulation of which throws the cone wheel in or out of gear by shifting the same on the crank shaft.

A pair of friction disk or face wheels 3 is located for coöperation on opposite sides of the cone wheel 1, said disk wheels being mounted upon a cross shaft $3^a$ supported in a bearing on a longitudinal bridge 17 between the cross bars of the frame. One disk wheel is fast on the shaft and the other is loose, as they rotate in different directions. They are driven by the contact of the cone wheel 1 against their opposite faces. On the outer sides of the disk wheels 3 are plain friction wheels 4 mounted upon a pair of shafts 5 carried in bearings on the frame. The shafts are square so that the friction wheels 4 can be slid along the same, to either side of the center of the disk wheels, whereby the speed is varied and the drive is reversed. The shafts 5 are respectively connected to shaft sections $5^a$, which are in turn connected to shaft sections $5^b$, in each instance by universal joints 18, and the shaft sections $5^b$ carry bevel gears 19 which mesh with the gears $19^a$ on the rear shaft sections 20, the gearing being properly arranged to drive the shaft sections in the same direction.

The shaft sections 5 are mounted for slight lateral motion to engage or disengage the wheels 4 from the disks. A preferred arrangement is illustrated in Fig. 4. The rear ends of the shafts are carried in boxes 12 which have a slight pivotal motion, and the front ends are carried in boxes 13 which are slidable laterally to a limited extent on the front cross bar of the frame 40. Movement is produced by means of a pedal B connected to the box 13 by a rod $b$ and links 14 and 15 which are disposed at an acute angle to each other. When the pedal B is pressed in one direction it tends to bring the links 14 and 15 into a straight line and to thereby draw the boxes 13 toward each other which has the effect of throwing the friction wheels 4 against the disks 3. Opposite movement of the pedal tends to separate the boxes or move them outwardly to disengage the friction gear. The engine shaft finds a bearing in the box 16 on the frame.

To manually vary the speed the friction wheels 4 are moved across the faces of the disk wheels 3 by means of a lever 50 mounted on one end of a rock shaft 51 which has a crank arm 52 connected by a link 53 to an arm 9ª projecting from the middle of a rock shaft 9, a ball and socket joint being formed at 10 between the link 53 and the arm to allow a turning movement to be hereafter described. The rock shaft 9 is mounted in a bearing box 8ª at the middle thereof, and said shaft has arms 9ᵇ which are connected by links 6 to collars 55 which extend around necks formed on the hubs of the friction wheels 4. When the lever 50 is shifted one way or the other the friction wheels 4 are moved accordingly across the faces of the disk wheels 3 and the speed is correspondingly varied or reversed. The friction wheels are dished slightly at the center, as indicated at 3ᵇ, so as to break the driving engagement when the wheels are on center. The joints between the crank arms 9ᵇ and the links 6 are ball and socket or universal joints, as indicated at 56.

To produce differential drive of the respective axle sections, according to the turn of the front or steering wheels the rock shaft 9 is connected at its opposite ends by links 11 to the opposite ends of the front axle, or rather to the steering knuckles at the ends thereof. Ball and socket joints are provided at 57 between the rear ends of the rods 11 and the ends of the rock shaft 9. The bearing box 8ª, at the middle of the rock shaft, is supported by a pivot stem 8 which is mounted on a yoke frame 7, in a middle vertical bearing at 61, said yoke frame being bolted to the frame 40 and having sufficient rise to allow the engine shaft to pass thereunder. The pivot 8 is held by a nut 80. By means of this arrangement, when the steering wheels are turned the rock shaft 9 is turned accordingly, on its central pivot at 8, and by means of the links 6 and connections the friction wheels 4 are shifted in correspondingly opposite directions, whereby the driven speed of one shaft section is increased and that of the other decreased, and this is true irrespective of the position of the speed and reverse lever 50. The differential driving speed thus produced is communicated to the rear axle sections, whereby the rear wheels are driven at different speeds and the vehicle will turn accordingly.

It is to be observed that both rear wheels are positively driven under all conditions, either when going straight ahead or when turning, and this is a decided advantage over the result reached when a differential gearing between rear axle sections is employed with a single drive. The machine may be stopped either by throwing the cone wheel 1 out of gear or moving the friction wheels 4 out of contact, or shifting said wheels 4 to central position. The length of the rock shaft 9 and its connections to the front axle will be properly proportioned to produce variation in the position of the friction wheels 4 corresponding to the difference in speed necessary to enable the rear wheels to follow the curve produced by the steering wheels as the latter are turned.

The invention is not limited to the particular form shown. Especially the manipulating devices for the several parts may be changed, and various other modifications may be made within the scope of the following claims.

I claim:

1. In a motor vehicle, the combination of driven axle sections, a driving-shaft, separate intermediate shafts geared to the axle sections and to said shaft and parallel to the latter, the gearing between the driving and intermediate shafts including friction wheels on the intermediate shafts and connected to the steering devices of the vehicle and shiftable thereby on said shafts to vary the speed of the respective intermediate shafts.

2. In a motor vehicle, the combination of driven axle sections, opposite flat-faced friction disks and means to drive the same, a pair of intermediate shafts geared to the axle sections and located at an angle thereto and extending across the faces of said disks, and friction wheels mounted on said intermediate shafts and manually slidable across the respective disks to vary the speed of the respective shafts, and means connected to and controlled by the steering devices of the vehicle to shift said friction wheels differentially according to the turn of the vehicle.

3. In a motor vehicle, the combination of driven axle sections, a pair of friction gears operatively connected to the sections respectively and located with their axes extending lengthwise of the vehicle means to drive said gears, a rock shaft extending across the vehicle frame and connected at its opposite ends to the gears to shift the same and pivotally mounted to swing laterally and steering devices for the vehicle connected to said rock shaft to swing the same and shift the gears according to the turn of the vehicle.

4. In a motor vehicle, the combination of driven axle sections, a pair of friction gears operatively connected to the sections respectively and located with their axes at a right angle to that of the axle, means to drive said gears, a rock shaft extending across the vehicle parallel to the axle and connected at its opposite ends to the gears to shift the same and pivotally mounted to swing laterally, and steering devices for the vehicle, connected to said rock shaft to swing the same and shift the gears according to the turn of the vehicle, and manually operated means to turn the rock shaft on its axis to vary the speed.

5. In a motor vehicle, the combination of driven axle sections, intermediate shafts geared at one end to said sections respectively, a pair of friction disks located between the other ends of said shafts, friction wheels slidably mounted on said shafts and arranged to contact with the outer sides of said disks, a driving shaft, a friction wheel mounted on the driving shaft for contact with the inner sides of said disks, and steering devices for the vehicle, connected to said slidable friction wheels and arranged to shift the same differentially according to the turn of the vehicle.

In testimony whereof, I affix my signature in presence of two witnesses.

ALDON R. CORRINGTON.

Witnesses:
  M. J. FRAMBACH,
  G. E. KNAACK.